United States Patent
Qiu

(10) Patent No.: US 7,068,755 B2
(45) Date of Patent: Jun. 27, 2006

(54) METHODS AND APPARATUS FOR CHARACTERIZING SUBSCRIBER LOOP BASED ON ANALYSIS OF DSL HANDSHAKING SIGNALS AND FOR OPTIMIZATION OF DSL OPERATION

(75) Inventor: Sigang Qiu, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 10/644,229

(22) Filed: Aug. 20, 2003

(65) Prior Publication Data

US 2005/0041782 A1    Feb. 24, 2005

(51) Int. Cl.
*H04M 1/24* (2006.01)
*H04M 3/08* (2006.01)
*H04M 3/22* (2006.01)

(52) U.S. Cl. ............... 379/1.04; 379/1.03; 379/24; 379/27.08; 379/28

(58) Field of Classification Search ......... 379/1.01, 379/1.03, 1.04, 21, 22, 22.04, 23, 24, 27.08, 379/28; 370/252, 253; 375/222, 224, 225, 375/227, 231
See application file for complete search history.

(56) References Cited

U.S. PATENT DOCUMENTS

| | | | |
|---|---|---|---|
| 6,263,048 B1 * | 7/2001 | Nelson et al. | 379/27.03 |
| 6,445,773 B1 * | 9/2002 | Liang et al. | 379/1.04 |
| 6,625,777 B1 * | 9/2003 | Levin et al. | 714/774 |
| 6,725,176 B1 * | 4/2004 | Long et al. | 702/183 |
| 6,760,847 B1 * | 7/2004 | Liu et al. | 713/300 |
| 6,826,258 B1 * | 11/2004 | Afzal | 379/1.04 |
| 6,845,248 B1 * | 1/2005 | Johnson | 455/554.2 |
| 2003/0095591 A1 * | 5/2003 | Rekai et al. | 375/225 |
| 2004/0258000 A1 * | 12/2004 | Kamali et al. | 370/252 |
| 2005/0021835 A1 * | 1/2005 | Palm | 709/237 |

* cited by examiner

*Primary Examiner*—Quoc Tran
(74) *Attorney, Agent, or Firm*—Buckley, Maschoff & Talwalkar LLC

(57) ABSTRACT

In some embodiments, a method includes performing at least part of a digital subscriber line (DSL) handshaking process by transmitting at least one handshaking signal via a telephone subscriber loop, and analyzing the at least one handshaking signal to detect a characteristic of the telephone subscriber loop.

16 Claims, 10 Drawing Sheets

US 7,068,755 B2

1

METHODS AND APPARATUS FOR CHARACTERIZING SUBSCRIBER LOOP BASED ON ANALYSIS OF DSL HANDSHAKING SIGNALS AND FOR OPTIMIZATION OF DSL OPERATION

BACKGROUND

A variety of DSL (digital subscriber line) services have been developed to provide subscribers with high speed data communication access over voice-grade telephone subscriber loops. However, not all subscriber loops are suitable for DSL service, and it is generally labor intensive and expensive to determine the suitability of a subscriber loop for DSL.

Another problem encountered with DSL services is that the encoding/decoding and modulation/demodulation utilized for transmission of data over a DSL link may require significant processing resources.

DETAILED DESCRIPTION

Figure 1:
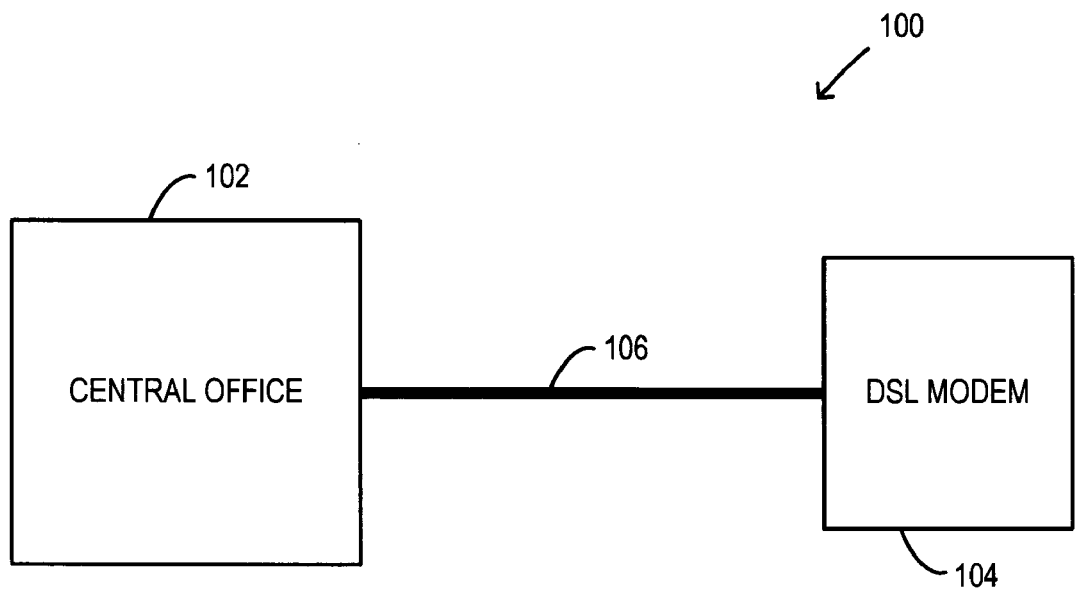
FIG. 1 is a simplified block diagram of a data communication system according to some embodiments.

FIG. 1 is a block diagram of a data communication system 100 according to some embodiments. The data communication system includes a telephone central office 102 and a DSL modem 104, as well as a telephone subscriber loop 106 connecting the DSL modem 104 to the central office 102. The physical components which constitute the subscriber loop 106 may be conventional. The DSL modem 104 and the central office 102 may, according to some embodiments, have capabilities that are described below. Not separately shown in the drawing are one or more DSLAMs (DSL access multiplexers) that may be installed at the central office 102 to allow the central office to provide DSL service over subscriber loops connected to the central office. As is familiar to those who are skilled in the art, the DSL modem 104 may be considered to be an item of telephone terminal equipment.

Figure 2:
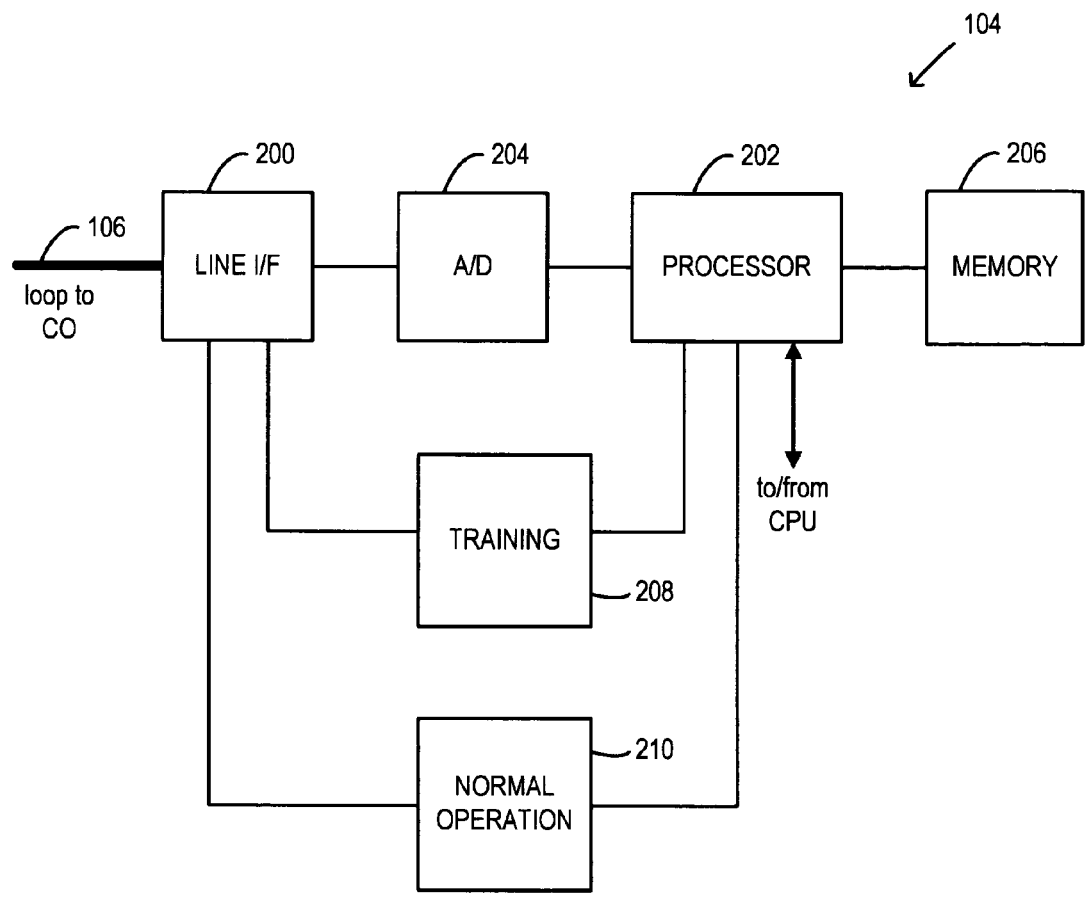
FIG. 2 is a block diagram of aspects of a DSL modem that is part of the system of FIG. 1.

FIG. 2 is a block diagram that shows some aspects of the DSL modem 104. The DSL modem 104 includes a line interface 200 by which the DSL modem 104 is coupled to the subscriber loop 106. The DSL modem 104 also includes a processor 202 coupled to the line interface 200 via an analog-to-digital converter 204. Also included in the DSL modem 104 is a memory 206 coupled to the processor 202. The processor 202 may be a stand-alone processing device (such as a conventional microprocessor or microcontroller) which operates under control of software or firmware stored in the memory 206, or the processor 202 may be constituted by some or all of a special-purpose processing device such as an ASIC (application specific integrated circuit).

Interactions between the DSL modem 104 and the central office 102 may fall into three phases: handshaking, training and normal operation. Blocks for handling functions of the DSL modem 104 in connection with the training and normal operation phases are respectively indicated at 208 and 210 in FIG. 2. However, in some embodiments, some or all of the functions of blocks 208 and 210 may be performed by the processor 202.

In some embodiments, all of the DSL modem 104, except for some functionality of the processor 202 and/or some software or firmware stored in the memory 206, may be provided in accordance with conventional practices. Processor functions and software or firmware provided in accordance with some embodiments will be described below.

The DSL modem 104 and the central office 102 may both be arranged to interact with each other according to a conventional DSL handshaking procedure, such as that prescribed in the International Telecommunication Union Telecommunication Standardization Sector (ITU-T) G.994.1 standard. In some central offices, the DSLAMs (not shown) support two sets of carrier signals for handshaking signaling. These two sets of carrier signals are referred to as A43 and B43 carrier sets in connection with the G.994.1 standard. The A43 set consists of the carrier frequencies 172.5 kHz, 241.5 kHz and 276 kHz. The B43 set consists of the carrier frequencies 310.5 kHz, 379 kHz and 414 kHz. During handshaking, the central office sends to the DSL modem a multi-tone signal, known as the C-TONE, that may include all six of these carrier frequencies. These six carrier frequencies, or a subset thereof such as the A43 carriers alone, will sometimes be referred to herein as the "downstream signal carriers".

In accordance with the G.994.1 standard, the DSL modem may support signaling in the upstream direction (i.e., from the modem to the central office). The upstream signal may be a multi-tone signal which may include an upstream A43 carrier set consisting of the carrier frequencies 38.8125 kHz, 73.3125 kHz and 107.8125 kHz. The upstream multi-tone signal is sometimes referred to as the R-TONE, and the constituent frequencies of the R-TONE will sometimes be referred to herein as the "upstream carrier frequencies".

In other embodiments, some or all of these downstream and upstream carrier frequencies, and/or other upstream and/or downstream carrier frequencies (including the C43, J43 and A4 carrier sets defined in the G.994.1 standard) may be employed.

Figure 3:
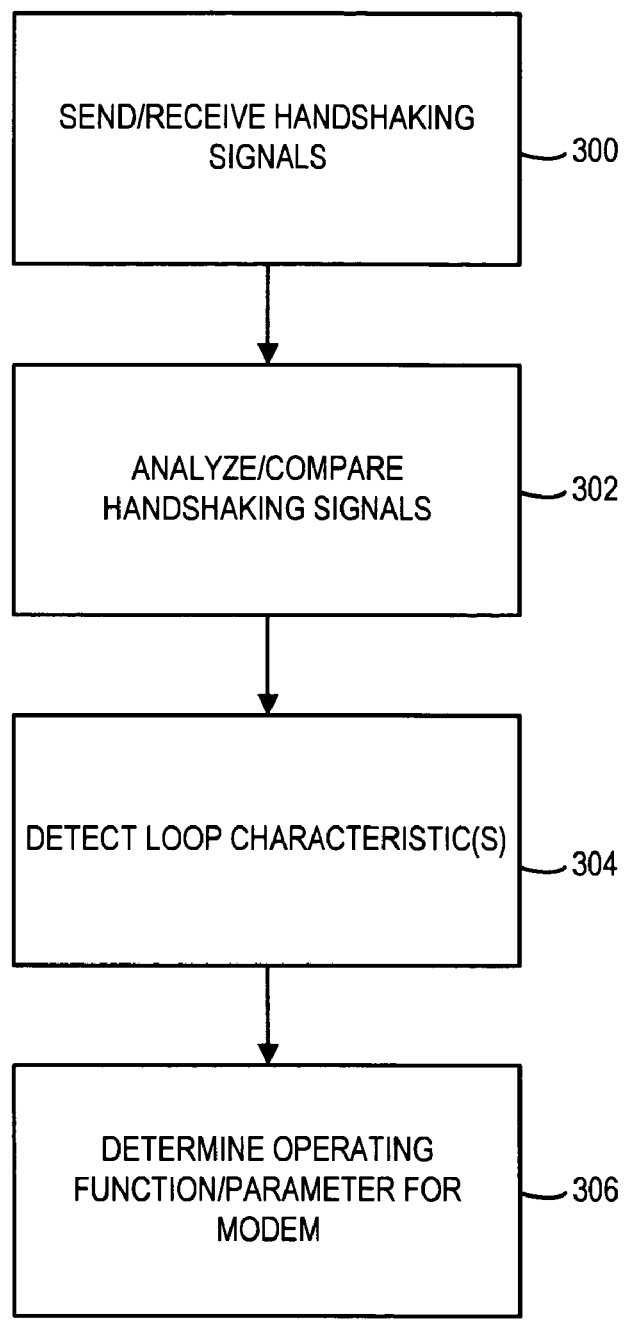
FIG. 3 is a flow chart that illustrates a subscriber loop characterization process performed by the DSL modem of FIG. 2 according to some embodiments.

FIG. 3 is a flow chart that illustrates a subscriber loop characterization process performed by the DSL modem 104 according to some embodiments. At 300 in FIG. 3, the DSL modem 104 receives and/or sends handshaking signals to/from the central office 102. This may occur as a portion of a handshaking process performed by the DSL modem 104 and the central office 102. In some embodiments, the DSL modem 102 may receive the above-mentioned C-TONE signal from the central office 102 and may send the above-mentioned R-TONE signal to the central office. The C-TONE signal received by the DSL modem 102 may, in some embodiments, include both the A43 and the B43 carrier sets referred to above; in other embodiments, the C-TONE signal may include only the A43 carrier set.

At 302 in FIG. 3, the DSL modem 104 analyzes and compares at least some of the handshaking signals exchanged at 300. For example, this may be done, at least in part, by the processor 202 (FIG. 2) operating under the control of a program stored in the memory 206. Alternatively, this may be done by hard-wired circuitry, which is not separately shown from the processor 202.

Figure 3A:
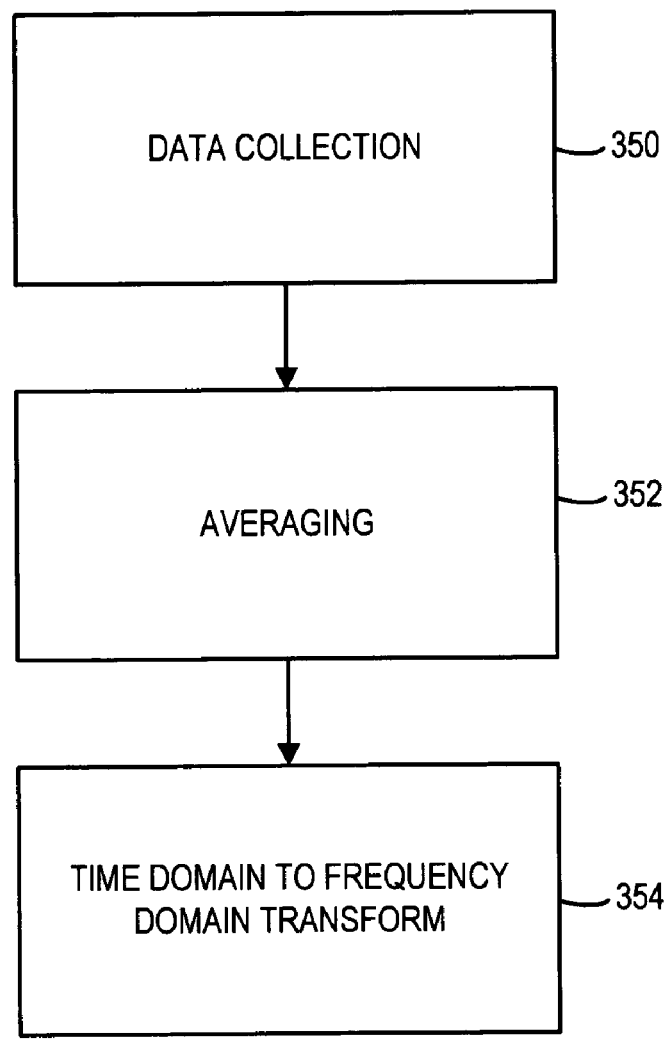
FIG. 3A is a flow chart that illustrates some details of the process of FIG. 3.

FIG. 3A is a flow chart that illustrates some details of the handshaking signal analysis performed at 302 in FIG. 3. At 350 in FIG. 3A, raw loop characterization data is collected by, for example, sampling and analog-to-digital converting some or all of the downstream and upstream carrier signals included respectively in the C-TONE and the R-TONE, respectively. This may be done by the analog-to-digital converter 204 shown in FIG. 2, under the control of the processor 202. Then, as indicated at 352 in FIG. 3A, the processor 202 may perform averaging of at least some of the data samples (e.g., the C-TONE data samples) obtained at 350. This may be done to improve the accuracy of the data, and to minimize the effect of noise that may be present in the subscriber loop 106 (FIG. 1). In some embodiments, the averaging of the data samples may be omitted.

Next, as indicated at 354, a transform such as a DFT (discrete Fourier transform) or an FFT (fast Fourier transform) may be performed to transform the time domain data obtained at 350 and 352 into frequency domain data. At least some calculations for the transform may be performed by the processor 202. As an alternative to a conventional DFT or FFT, a single point DFT may be performed.

Referring again to FIG. 3, at 304 the DSL modem 104 detects one or more characteristics of the subscriber loop 106 on the basis of the data analysis and comparison performed at 302. As will be seen, in some embodiments the DSL modem 104 may detect an estimated length of the subscriber loop 106.

Figure 4:
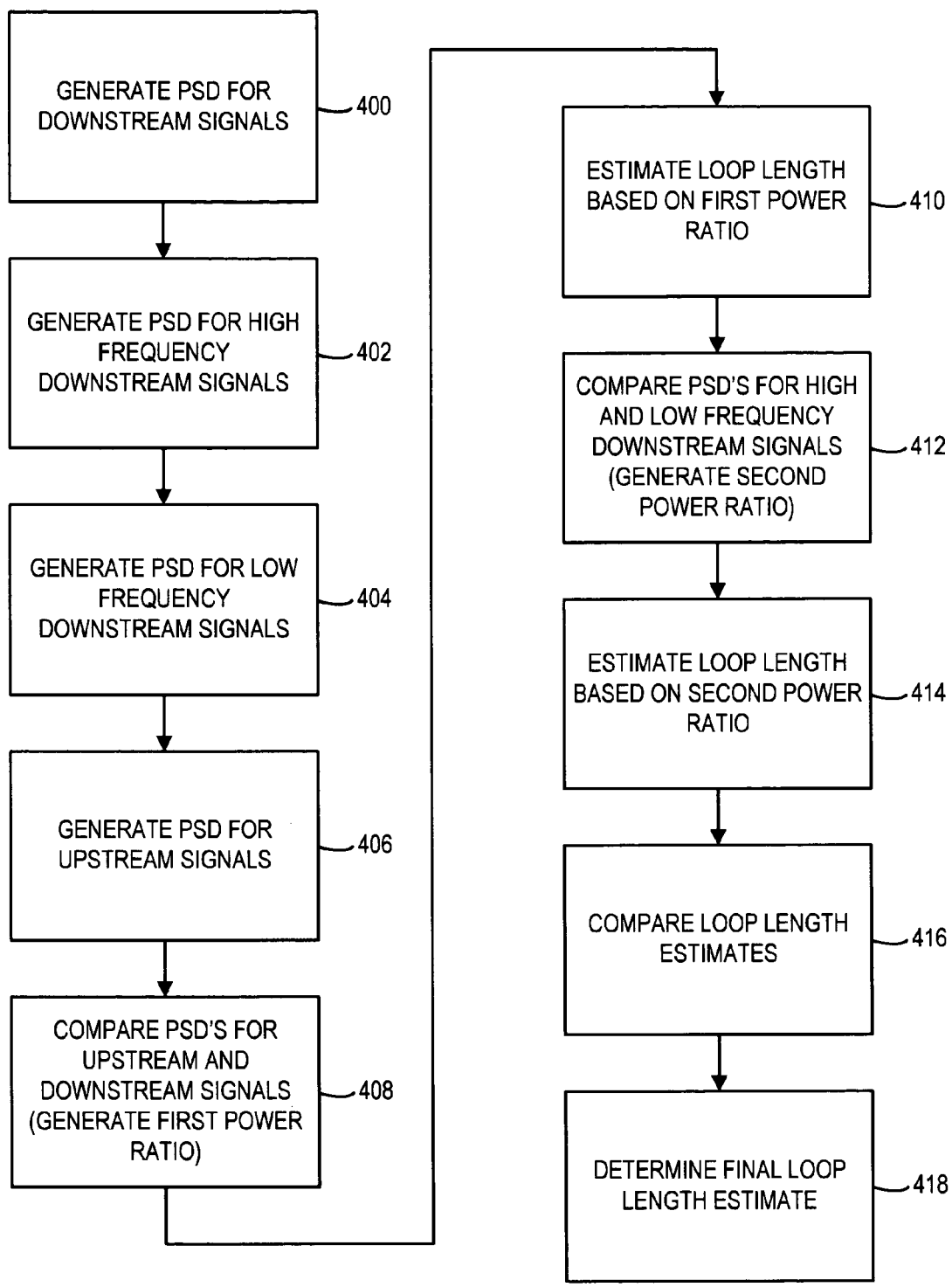
FIG. 4 is a flow chart that illustrates other details of the process of FIG. 3.

FIG. 4 is a flow chart that illustrates further details of the handshaking signal analysis and comparison performed at 302 and of the loop characteristic detection performed at 304 in FIG. 3. At 400 in FIG. 4, the DSL modem 104 (e.g., the processor 202) generates (e.g., calculates) a power spectrum density for the downstream handshaking signals. This may be done, for example, by summing the respective signal powers in the downstream frequency bins.

At 402, the DSL modem 104 generates a power spectrum density for a group of relatively high frequency downstream handshaking signals. In some embodiments, this group of signals may be the B43 downstream carrier frequency set. Thus, the power spectrum density for the "high frequency" downstream signals may be generated by summing the respective signal powers in the frequency bins of the B43 downstream carrier frequency set.

At 404, the DSL modem 104 generates a power spectrum density for a group of relatively low frequency downstream handshaking signals. In some embodiments, this group of signals may be the A43 downstream carrier frequency set. Thus, the power spectrum density for the "low frequency" downstream signals may be generated by summing the respective signal powers in the frequency bins of the A43 downstream carrier frequency set.

At 406, the DSL modem 104 generates a power spectrum density for the upstream handshaking signals. This may be done, for example, by summing the respective signal powers in the upstream frequency bins.

At 408, the DSL modem 104 may compare the respective power spectrum densities for the upstream and downstream signals by calculating a ratio of the upstream signal power spectrum density to the downstream signal power spectrum density. This ratio may be referred to as a "first power ratio". Then, as indicated at 410, the DSL modem may determine an estimated loop length based on the first power ratio.

Figure 5:
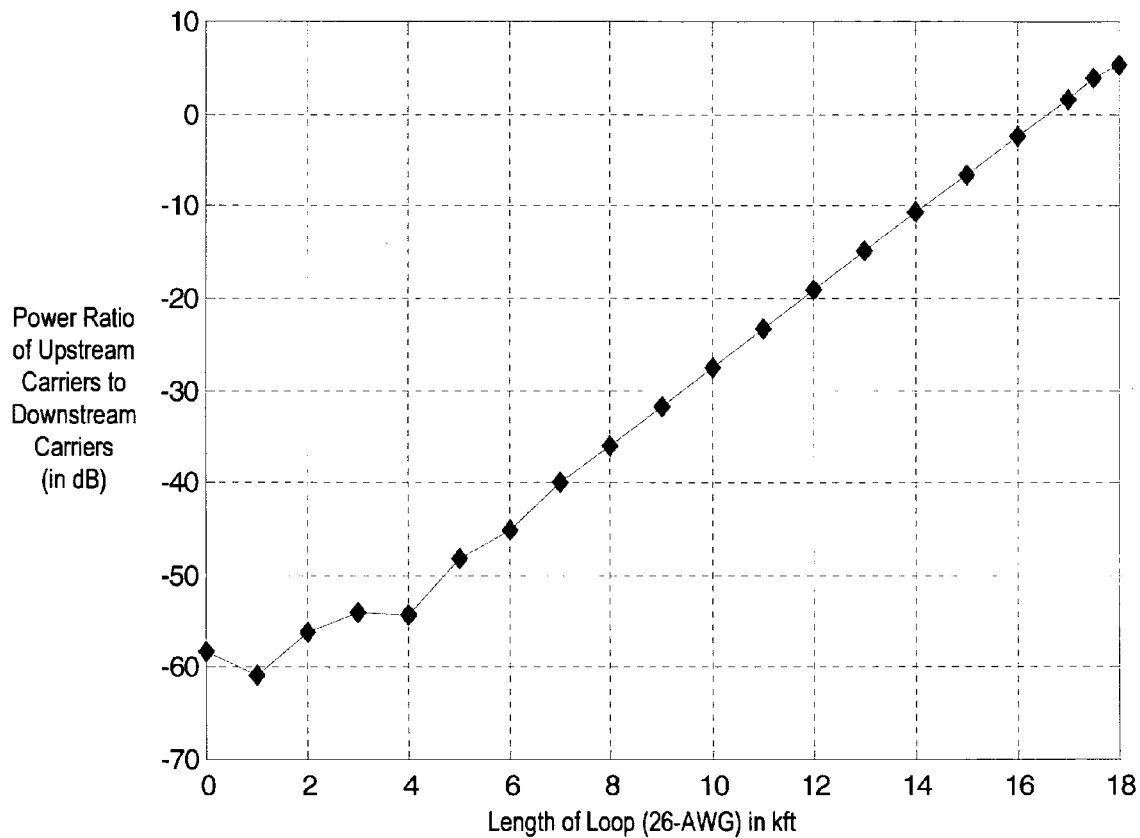
FIG. 5 is a graph that illustrates a technique provided according to some embodiments for determining a length of a subscriber loop based on analysis of DSL handshaking signals.

FIG. 5 is a graph that shows data obtained in a simulation that indicates a relationship between the length of the subscriber loop (assuming the subscriber loop is formed of 26-AWG wire) and the first power ratio. The data shown in FIG. 5 was obtained by transmitting the C-TONE and the R-TONE in simulated subscriber loops with white noise added. For a loop length of less than 5,000 feet, the first power ratio is less than about −50 dB. For loop lengths from about 5,000 feet to about 16,000 feet, there is a substantially linear relationship between the first power ratio and the loop length. As can be seen from FIG. 5, if the loop length exceeds 16,000 feet, the first power ratio is about 0 dB or larger. If the first power ratio is about −5 dB or less it can be estimated with considerable confidence that the loop length does not exceed about 15,000 feet. Also, the loop length may be estimated at 10,000 feet or less when the first power ratio is about −28 dB or less, and may be estimated to exceed 10,000 feet when the first power ratio is more than about −28 dB.

Referring again to FIG. 4, at 412 the DSL modem 104 may compare the respective power spectrum densities for the high frequency downstream signals and the low frequency downstream signals by calculating a ratio of the high frequency downstream signal power spectrum density to the low frequency downstream power spectrum density. This ratio may be referred to as a "second power ratio". Then, as indicated at 414, the DSL modem may determine an estimated loop length based on the second power ratio.

Figure 6:
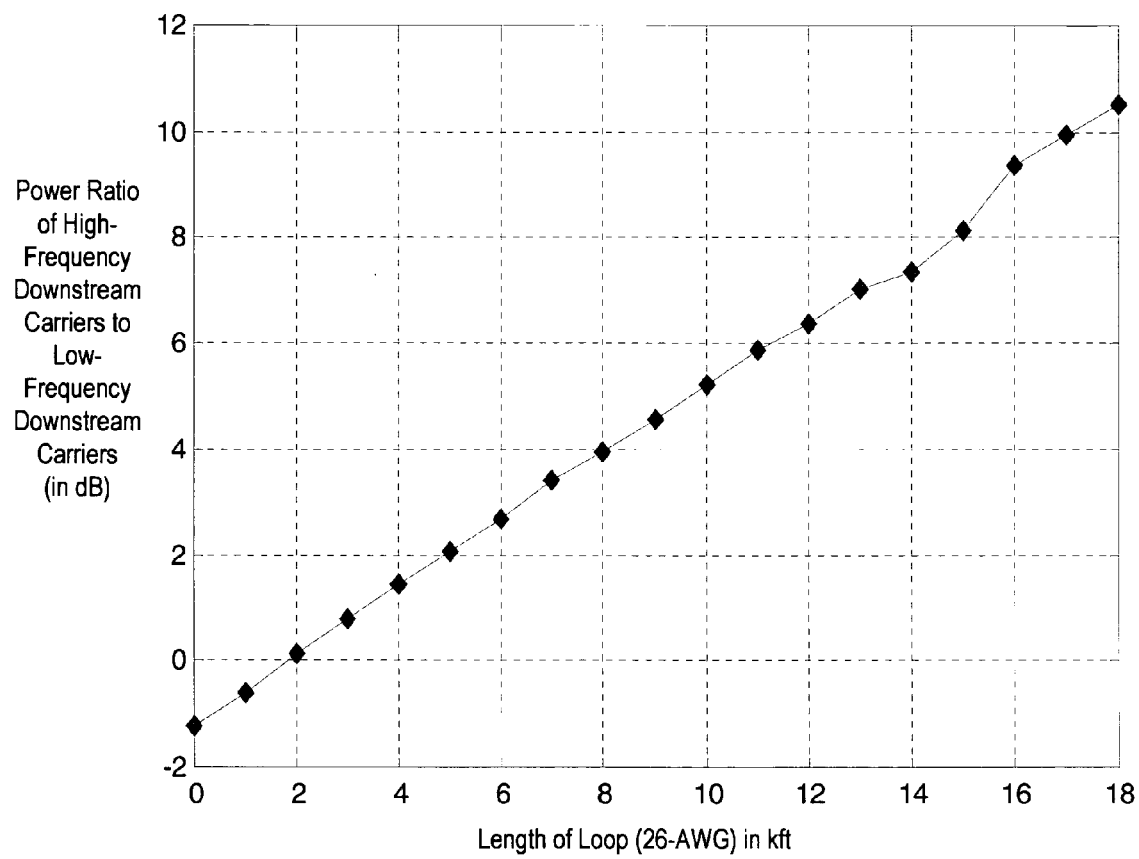
FIG. 6 is a graph that illustrates another technique provided according to some embodiments for determining a length of a subscriber loop based on analysis of DSL handshaking signals.

FIG. 6 is a graph that shows data obtained in a simulation that indicates a relationship between the length of the subscriber loop (again assuming the subscriber loop is formed of 26-AWG wire) and the second power ratio. The data shown in FIG. 6 was obtained by transmitting the C-TONE in simulated subscriber loops with white noise added. As seen from FIG. 6, the relationship between the loop length and the second power ratio is substantially linear.

Referring again to FIG. 4, at 416 the DSL modem 104 may compare the two loop length estimates obtained at 410 and 414. Then, on the basis of the comparison, a final loop length estimate may be determined, as indicated at 418. In some embodiments, the longer of the two estimates obtained at 410 and 414 may be selected to be the final loop length estimate.

In some embodiments, only the first power ratio may be determined, or only the second power ratio may be determined, and the length of the subscriber loop may be estimated based only on the first power ratio (e.g., using the data shown in FIG. 5), or based only on the second power ratio (e.g., using the data shown in FIG. 6), as the case may be. Of course, if only the first power ratio is determined, the power spectral densities for "high frequency" downstream signals and "low frequency" downstream signals need not be generated. Similarly, if only the second power ratio is determined, the power spectral densities for the upstream signals, and for the downstream signals as a whole, need not be generated.

In some embodiments, for the purposes of determining the second power ratio, the division of the downstream signals into three "high frequency" signals (e.g., the B43 downstream carrier set) and three "low frequency" signals (e.g., the A43 downstream carrier set) may be modified, such that, for example, the two lowest frequency downstream carriers are considered "low frequency" and the four highest frequency downstream carriers are considered "high frequency". As an alternative, the four lowest frequency downstream carriers are considered "low frequency" and the two highest frequency downstream carriers are considered "high frequency". More specifically, in various embodiments, the following sets of "low frequency" and "high frequency" signals may be employed to determine the second power ratio as alternatives to comparing the respective power spectrum densities of the B43 downstream carriers and the A43 downstream carriers.

Set 1:
"low frequency": 172.5 kHZ and 241.5 kHZ
"high frequency": 276 kHz, 310.5 kHz, 379.5 kHz and 414 kHz
Set 2:
"low frequency": 172.5 kHz
"high frequency": 241.5 kHz, 276 kHz, 310.5 kHz, 379.5 kHz and 414 kHz
Set 3:
"low frequency": 172.5 kHz, 241.5 kHz, 276 kHz and 310.5 kHz
"high frequency": 379.5 kHz and 414 kHz
Set 4:
"low frequency": 172.5 kHz, 241.5 kHz, 276 kHz, 310.4 kHz and 379.5 kHz
"high frequency": 414 kHz As used herein, a "group of signal carriers" will be understood to include a group consisting of one or more signal carriers.

Referring again to FIG. 3, one or more operating functions and/or operating parameters for the DSL modem 104 may be determined by the processor 202 (as indicated at 306) on the basis of the loop characteristic or characteristics detected at 304.

Figure 7:
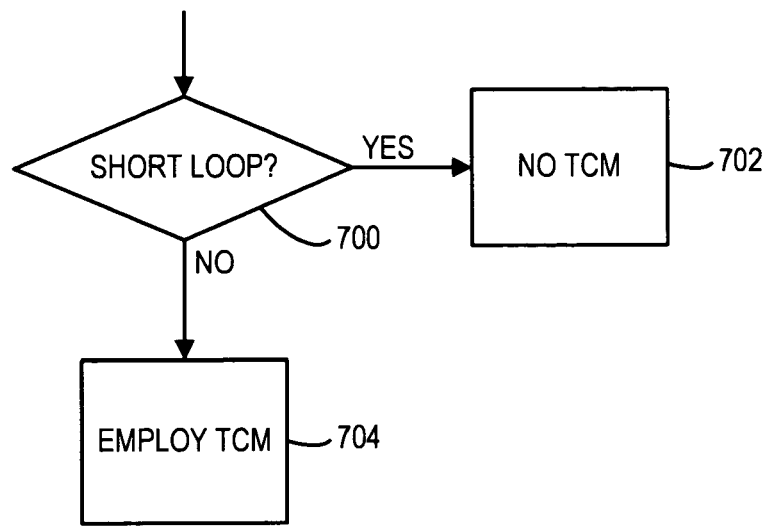
FIG. 7 is a flow chart that illustrates additional details of the process of FIG. 3.

FIG. 7 is a flow chart that illustrates some details of a determination made, in some embodiments, for example, at 306 in FIG. 3. Continuing to refer to FIG. 7, it may be determined (e.g., by the processor 202), as indicated at 700, whether the estimated length of the subscriber loop is relatively short (e.g., not more than about 10,000 feet in length). If so, then as indicated at 702, the DSL modem 104 may determine that trellis coded modulation (TCM) should not be employed in exchanging data over the subscriber loop during normal operations. For relatively short loop lengths, the subscriber loop may be of very good quality such that a data rate of about 8 Mbps may be provided, and TCM may be of little or no benefit. It may therefore be advantageous to reduce processing requirements for the DSL modem by omitting TCM where the loop length is estimated to be relatively short.

However, if it is determined at 700 that the loop length is not relatively short, then as indicated at 704, the DSL modem may determine that TCM should be employed in exchanging data over the subscriber loop during normal operations. For loop lengths that are not relatively short, the loop may be of rather poor quality and a rather low data rate (perhaps as low as 400 kbps) may be provided. In such cases the bit loading of the downstream sub-carriers may be light and the number of data-carrying carriers may be reduced. Consequently, the complexity of the TCM calculations may be significantly reduced, so that the processing burden is significantly less than for performing TCM at higher data rates.

TCM is generally well known to those who are skilled in the art, and is widely used in DSL operation, and so need not be described herein.

The selection of TCM or non-TCM operation may be communicated between the DSL modem 104 and the central office 102 as part of a capability message exchanged between the DSL modem and the central office at the conclusion of the handshaking process.

Determining whether or not to utilize TCM is one example of how loop characterization may be employed to optimize operation of a DSL modem. Alternatively or in addition to selecting TCM or non-TCM operation based on a detected loop characteristic such as loop length or estimated loop length, other operating functions or operating parameters may be selected on the basis of a detected loop characteristic to optimize operation of the DSL modem. For example, parameters for an equalizer function performed during a training phase of operation may be pre-set based on a detected estimated length of a subscriber loop to accelerate convergence and promote stability of an equalizer algorithm. The pre-setting of equalizer parameters may be applicable to either or both of a time-domain equalizer and a frequency-domain equalizer. As other examples, parameters for timing (clock) recovery and/or automatic gain control functions performed during a training phase of operation may be set based on the detected estimated loop length.

Circuitry (including but not limited to a suitably programmed processor) to carry out at least a portion of a DSL handshaking process and to perform loop characterization as in the processes of FIGS. 3, 3A and/or 4 may be incorporated in a device that is not a DSL modem or does not include a DSL modem. For example, such circuitry may be included in a personal computer that does not include a DSL modem. Such circuitry and/or a DSL modem like the modem 104 may be employed for other loop characterization processes besides those already described herein. For example, a process to determine the qualification of a telephone subscriber loop for DSL provisioning may be automatically performed as depicted in the flow chart of FIG. 8.

Figure 8:
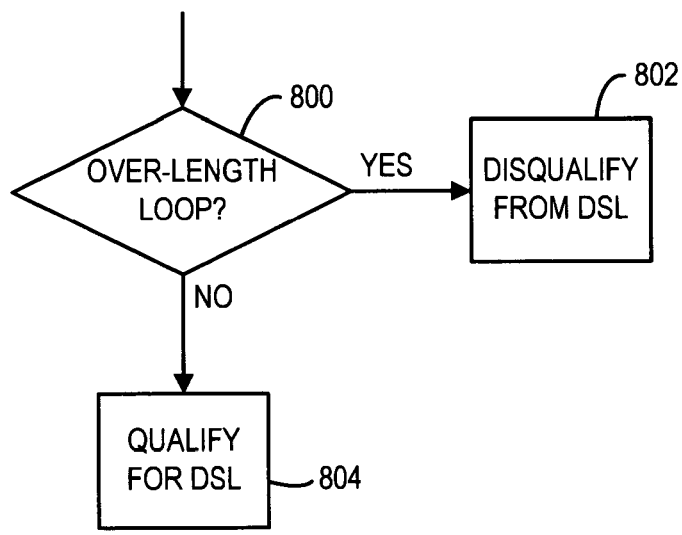
FIG. 8 is a flow chart that illustrates a process provided according to some embodiments for determining suitability of a subscriber loop for DSL service.

For purposes of FIG. 8, it is assumed that the circuitry described in the previous paragraph and/or a DSL modem 104 is employed to detect an estimated length of a subscriber loop in accordance with one or more of the processes described in connection with FIG. 4. Then, as indicated at 800 in FIG. 8, it is determined whether the subscriber loop is excessively long (e.g., 18,000 feet or longer). If so, then as indicated at 802 the subscriber loop is disqualified from DSL provisioning, since it is unlikely that it would be possible to provide satisfactory DSL service over an excessively long subscriber loop. However, if it is determined at 800 that the subscriber loop is not excessively long, then as indicated at 804, the subscriber loop may be considered to be qualified for DSL provisioning. In some embodiments, a personal computer of which the circuitry is a part may provide an output to a user and/or to a telephone company server (e.g., via the Internet) to indicate whether the subscriber loop is qualified or disqualified for DSL provisioning. The automatic determination of DSL qualification in this manner may be more efficient and cost-effective than conventional labor-intensive techniques for determining DSL qualification of a subscriber loop.

Figure 9:
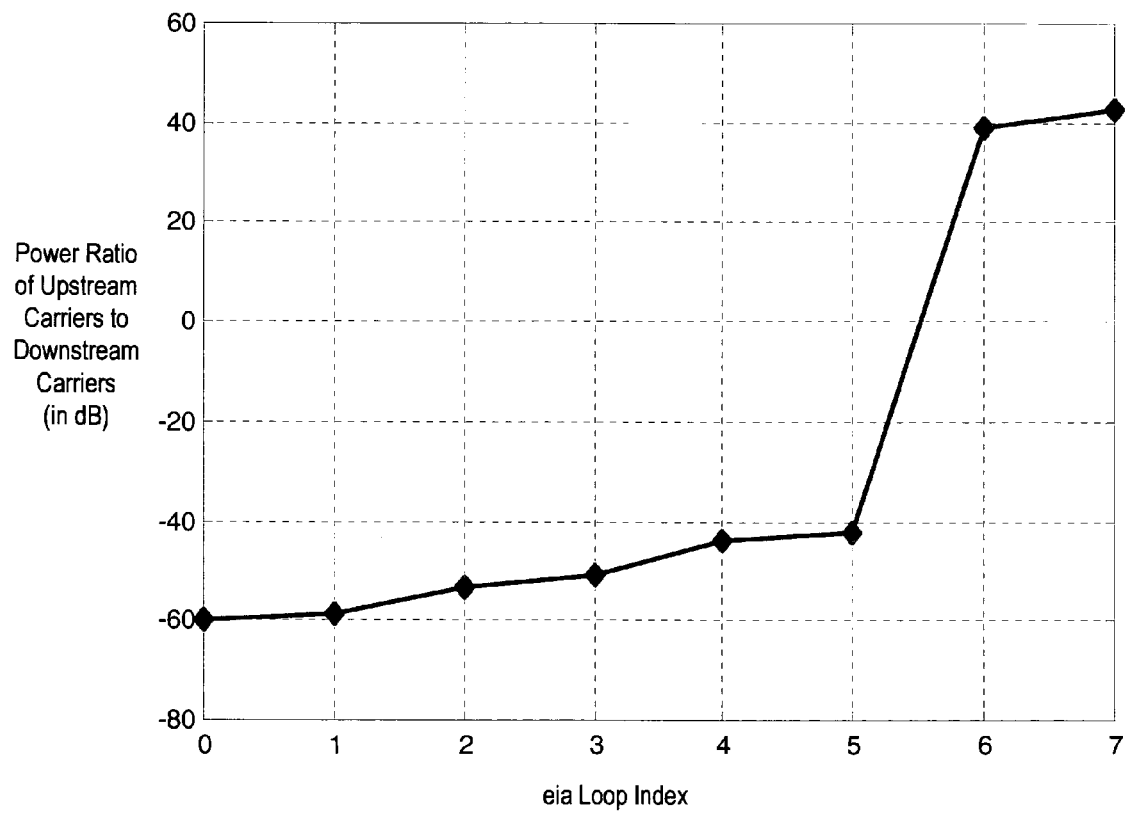
FIG. 9 is a graph that illustrates a technique for determining whether a subscriber loop meets a qualification for DSL service.

In other embodiments, a comparison of power spectral densities of upstream and downstream signals, as indicated at 400, 406 and 408 of FIG. 4, may be employed to detect loop characteristics other than estimated loop length. For example, a comparison of upstream to downstream signal power spectral densities may be used to determine whether a subscriber loop is coil-loaded. FIG. 9 is a graph that illustrates data obtained by a simulation in which a relationship between the first power ratio and a degree of loop loading is shown. Where the first power ratio has a value of about 40 dB or above, it may be concluded that the loop is coil-loaded, and therefore should be disqualified from DSL provisioning.

In some embodiments, other subscriber loop impairments, such as bridge taps or susceptibility to cross-talk, may be detected by similar techniques.

As described above, the so-called R-TONE (A43 upstream carrier set) may be used for loop characterization in some embodiments. In addition, or alternatively, one or more other upstream signaling tones, or other signals, may be used for loop characterization.

Figure 10:
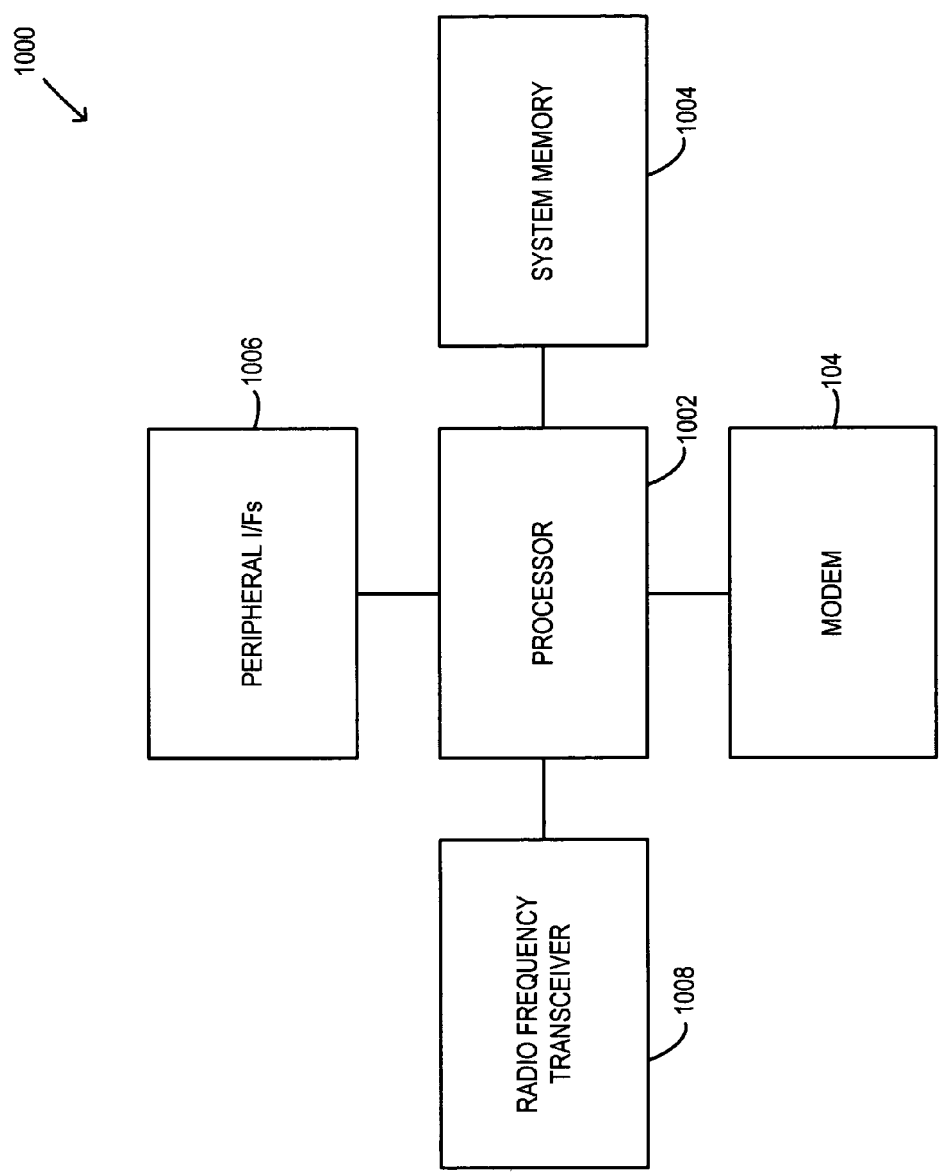
FIG. 10 is a block diagram of a computer system that includes the modem of FIG. 2.

FIG. 10 is a block diagram of a computer system 1000 that may include the DSL modem 104 of FIG. 2. The computer system 1000 includes a processor 1002, such as a conventional microprocessor, which is connected to the DSL modem 104. The computer system 1000 also may include system memory 1004 connected to the processor 1002 and one or more peripheral interfaces 1006 connected to the processor 1002. The computer system 1000 may also include a radio frequency transceiver 1008 that is coupled to the DSL modem 104 via the processor 1002.

Analyzing DSL handshaking signals to detect one or more telephone subscriber loop characteristics may help to promote efficient and cost-effective DSL provisioning and/or loop-adaptive operation of a DSL modem. Moreover, in some embodiments, determining whether to perform trellis coded modulation in a DSL modem, based on a detected loop characteristic such as estimated loop length, may be conducive to efficient and cost-effective operation of the DSL modem.

In other embodiments, a detected subscriber loop characteristic such as estimated loop length may be used to predict a data rate or other characteristic of DSL service to be provided via the subscriber loop. On the basis of the estimated data rate, for example, the subscriber may be charged a subscription rate that varies with the predicted quality of service. In addition or alternatively, the subscriber may be presented with a plurality of service level/billing options based on the predicted service quality that may be available via the subscriber loop.

Thus, in some embodiments, a method includes performing at least part of a DSL handshaking process by transmitting at least one handshaking signal via a telephone subscriber loop, and analyzing the at least one handshaking signal to detect a characteristic of the telephone subscriber loop.

In other embodiments, a method includes detecting a characteristic of a telephone subscriber loop, and determining an operating function of an item of terminal equipment connected to the telephone subscriber loop based at least in part on the detected characteristic of the telephone subscriber loop.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   performing at least part of a digital subscriber line handshaking process by transmitting at least one handshaking signal to or from a DSL modem via a telephone subscriber loop; and
   analyzing the at least one handshaking signal to detect an estimated length of the telephone subscriber loop;
   wherein the analyzing includes calculating a ratio of a power spectrum density of upstream signal carriers to a power spectrum density of downstream signal carriers, and the analyzing further includes calculating a ratio of a power spectrum density of a first group of downstream signal carriers to a power spectrum density of a second group of downstream signal carriers.

2. The method of claim 1, further comprising:
   determining an operating function of an item of terminal equipment connected to the telephone subscriber loop based, at least in part on the estimated length of the telephone subscriber loop.

3. The method of claim 2, wherein the determining includes determining whether to perform trellis coded modulation in the item of terminal equipment.

4. The method of claim 3, wherein it is determined not to perform trellis coded modulation in the item of terminal equipment if the estimated length of the telephone subscriber loop is less than a predetermined length.

5. The method of claim 4, wherein the item of terminal equipment is a digital subscriber line modem.

6. The method of claim 1, further comprising:
   determining, based at least in part on the estimated length of the telephone subscriber loop, a parameter for a digital subscriber line training process.

7. The method of claim 6, wherein the determined parameter is used for one of (a) an equalizer function, (b) a timing recovery function, and (c) an automatic gain control function.

8. The method of claim 1, further comprising:
   predicting a digital subscriber line service data rate for the telephone subscriber loop on the basis of the estimated length of the telephone subscriber loop.

9. An apparatus comprising:
   a memory;
   a processor coupled to the memory to:
   receive at least one handshaking signal transmitted to or from a DSL modem via a telephone subscriber loop in connection with a digital subscriber line handshaking process; and
   analyze the at least one handshaking signal to detect an estimated length of the telephone subscriber loop;
   wherein the analyzing includes calculating a ratio of a power spectrum density of upstream signal carriers to a power spectrum density of downstream signal carriers, and the analyzing further includes calculating a ratio of a power spectrum density of a first group of downstream signal carriers to a power spectrum density of a second group of downstream signal carriers.

10. The apparatus of claim 9, wherein the processor is also to determine not to perform trellis coded modulation if the estimated length of the telephone subscriber loop is less than a predetermined length.

11. An apparatus comprising:
    means for receiving at least one handshaking signal transmitted to or from a DSL modem via a telephone subscriber loop in connection with a digital subscriber line handshaking process; and means for analyzing the at least one handshaking signal to detect an estimated length of the telephone subscriber loop;

wherein the analyzing includes calculating a ratio of a power spectrum density of upstream signal carriers to a power spectrum density of downstream signal carriers, and the analyzing further includes calculating a ratio of a power spectrum density of a first group of downstream signal carriers to a power spectrum density of a second group of downstream signal carriers.

12. The apparatus of claim 11, further comprising:

means for determining not to perform trellis coded modulation if the estimated length of the telephone subscriber loop is less than a predetermined length.

13. An apparatus comprising:

a storage medium having stored thereon instructions that when executed by a machine result in the following:

receiving at least one handshaking signal transmitted to or from a DSL modem via a telephone subscriber loop in connection with a digital subscriber line handshaking process; and analyzing the at least one handshaking signal to detect an estimated length of the telephone subscriber loop;

wherein the analyzing includes calculating a ratio of a power spectrum density of upstream signal carriers to a power spectrum density of downstream signal carriers, and the analyzing further includes calculating a ratio of a power spectrum density of a first group of downstream signal carriers to a power spectrum density of a second group of downstream signal carriers.

14. The apparatus of claim 13, wherein the instructions stored on the storage medium, when executed by a machine, also result in:

determining not to perform trellis coded modulation if the estimated length of the telephone subscriber loop is less than a predetermined length.

15. A system comprising:

a radio frequency transceiver; and a digital subscriber line modem coupled to the radio frequency transceiver, the digital subscriber line modem including:

a memory;

a processor coupled to the memory to:

receive at least one handshaking signal transmitted to said digital subscriber line modem via a telephone subscriber loop in connection with a digital subscriber line handshaking process; and analyze the at least one handshaking signal to detect an estimated length of the telephone subscriber loop;

wherein the analyzing includes calculating a ratio of a power spectrum density of upstream signal carriers to a power spectrum density of downstream signal carriers, and the analyzing further includes calculating a ratio of a power spectrum density of a first group of downstream signal carriers to a power spectrum density of a second group of downstream signal carriers.

16. The system of claim 15, wherein the processor is also to determine not to perform trellis coded modulation if the estimated length of the telephone subscriber loop is less than a predetermined length.

* * * * *